March 1, 1960 W. V. HOSTETLER 2,926,427
LAMINATED TABLE

Filed Dec. 28, 1953 2 Sheets-Sheet 1

INVENTOR.
W. V. HOSTETLER
BY S. Tierney Jr.

March 1, 1960 W. V. HOSTETLER 2,926,427
LAMINATED TABLE
Filed Dec. 28, 1953 2 Sheets-Sheet 2

INVENTOR.
W. V. HOSTETLER
BY
S. Tierney Jr.

United States Patent Office 2,926,427
Patented Mar. 1, 1960

2,926,427

LAMINATED TABLE

Walter V. Hostetler, Spring Valley, Calif., assignor to Rohr Aircraft Corporation, Chula Vista, Calif., a corporation of California Application December 28, 1953, Serial No. 400,406

4 Claims. (Cl. 33—174)

In the manufacture of large articles of curved shape such as boats, the wings, tanks or fuselages of airplanes and similar curved objects, it is necessary to provide a table or fixture with a flat reference surface from which measurements may be taken to lay out the shape of the part or position the part correctly in relation to other parts making up the assembly. When extreme flatness is required in the reference surface, it has been the practise to first machine and then grind it and if the table is large as, for example, one having an area of 12 or more square feet, the cost of this machining and grinding is high. It is a main purpose of my invention to very substantially lower the cost of production of such a table and yet keep its surface flat and smooth within close tolerance limits.

The machining and grinding of such tables has also required much time and the use of large, expensive machinery. It is a purpose of this invention to greatly decrease the time required to produce such a table and to obviate the use of such machinery.

A further purpose of the invention is to provide a table or fixture whose surface consists of a single sheet of material thin and flexible enough to be pressed and held against the top of a master surface plate. This sheet is preferably composed of metal which is hard enough to withstand without appreciable indentation blows incident to tools or other moving objects hitting it.

A further object is to provide a rigid backing plate which is thick and massive enough to retain its shape and which is permanently secured to the aforesaid thin sheet by a thin layer of plastic material which sets hard upon standing.

When the table is to be used as a fixture for making a curved part or assembly, the curve is preferably inscribed or photographically reproduced on the thin sheet before the sheet is attached to the backing plate or member. In the aircraft industry it has been the practise to photographically reproduce a master pattern on the surface of thin sheet metal and for a toolmaker to lay out on the flat surface of a rigid fixture a curve or outline which is an exact copy of the photographic reproduction. This method consumes much time and errors in measurement are likely to arise while the pattern is being laid out on the surface of the fixture. These disadvantages are overcome by the present invention.

Another object is to provide a method for making a flat table top of plastic material which sets or hardens at normal room temperature or a temperature not much above room temperature.

A further object is to provide a flat table top of plastic material whose upper face has securely attached thereto a large number of small metal particles which have a low coefficient of friction so that a tool used in conjunction with the table may be easily slid along the surface.

For a better understanding of the invention reference is made to the accompanying drawings, in which.

Figure 1:
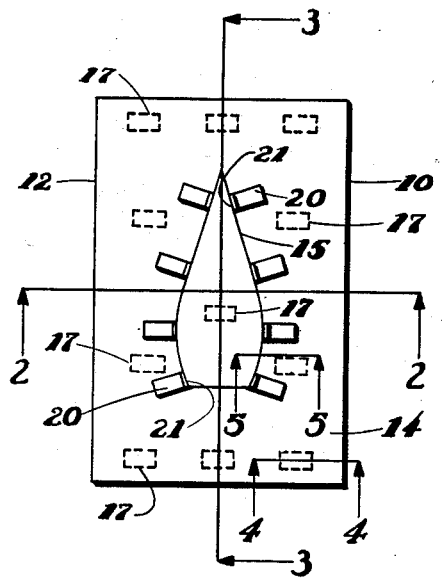
Fig. 1 is a top view of a fixture embodying the invention.
Figure 2:
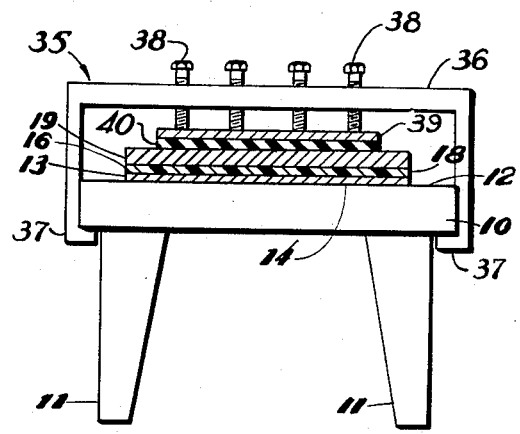
Fig. 2 is a view partly in section on line 2—2 of Fig. 1 of a fixture in process of formation on a master surface plate.
Figure 4:
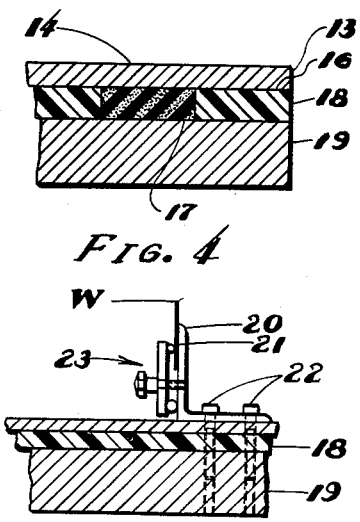
Fig. 4 is an enlarged sectional view of a portion of the fixture taken on line 4—4.

Referring to Figs. 1 and 2, a slab 10 of any suitable hard, rigid, non-porous material is supported at a convenient height on a plurality of legs 11. The slab may be made, for example, of a single block of granite, marble, steel or other material 2 inches or more thick and 6 feet wide and 8 feet long or larger according to the size of the fixture to be made. After suitable aging, the top face 12 is machined and ground smooth and flat within a tolerance of .0005 inch by any suitable known method. The slab 10 thereafter serves as a master surface plate for producing fixtures having flat surfaces of any size up to that of face 12.

A thin sheet 13 of metal which is smooth and free of imperfections is selected, this sheet being thin and flexible enough to conform to flat face 12 when laid and pressed thereon. Cold rolled sheet steel having a thickness of the order of .060 inch or less is suitable, but where the hardness of steel is not required in the fixture, aluminum, brass, copper or other softer metal may be used instead. The lower face 14 of sheet 13 has a contour line 15 inscribed thereon in any suitable manner or the line may be a photographic reproduction of a master which serves as an original standard of comparison. The upper face 16 of sheet 13 is roughened, as by etching with acid or sandblasting, and the dry sheet is placed on slab 10 with its lower smooth face 14 down. A plurality of small blocks 17 of porous sponge rubber about ⅛ inch thick and ½ inch square are saturated with plastic resin of the type to be described and distributed at spaced apart points over surface 16. A fluid plastic material is then poured or otherwise spread over surface 16 to provide a plastic layer 18 which bonds sheet 13 to a rigid metal backing plate 19. Layer 18 preferably has a thickness of ⅟₁₆ inch or more and is composed of powdered metal distributed in a plastic material which cures or hardens at a relatively low temperature. The powdered metal, such as aluminum or iron, is mixed with a synthetic plastic preferably of the thermosetting type, which hardens at atmospheric temperature and pressure in the presence of a suitable curing agent. The epoxy resins are especially suitable on account of their excellent adhesive properties but certain phenolic and polyester resins may be used instead. Suitable curing agents for hardening the epoxy plastics at room temperature are tri-dimethyl amino methyl phenol; diethylene triamine; dimethyl amino propylamine. Three parts of the first named agent mixed with 100 parts of an epoxy resin caused the resin to set hard within 5 hours.

Backing plate 19 may be cast iron or steel but if lightness in the finished fixture is desired, aluminum or other light metal may be used instead. The plate should be thick enough so that it will not change shape during the handling and use of the completed table or fixture. A thickness of about 1 inch has been found suitable for a table 2 feet wide by 3 feet long and the thickness should be correspondingly greater as the area of the table increases. When plate 19 is lowered onto the plastic 18 it compresses the sponge rubber blocks 17 and they, together with the plastic, press metal sheet 13 firmly against the level face 12 so that the lower face 14 of the sheet becomes flat within a tolerance of the order of .001 inch. A small amount of the fluid plastic runs down the edges of sheet 13 and upon hardening assists in bonding the parts together. The full weight of plate 19 is applied to the plastic 18 and after 4 or more hours, depending on the composition of the plastic used, the plastic becomes rigid and bonds the laminated parts permanently together. The presence of the metal powder increases the viscosity of the plastic mixture so that it does not flow out of the confined space and also increases the compressive strength of the plastic layer. However, in certain installations where less strength is required, the metal powder may be omitted from the mix.

When the plate 19 is light, it is desirable to apply additional pressure to keep metal sheet 13 pressed against flat face 12 as the plastic sets. For this purpose a plurality of clamps may be provided to apply pressure to the top of plate 19 at spaced apart points along its length, one such clamp 35 being shown in Fig. 2. The clamp is preferably made of steel and comprises a flat body portion 36 which has depending legs 37 which hook under slab 10. Straight body portion 36 has a plurality of threaded holes which receive bolts 38. The ends of the bolts engage a metal sheet 39 about ¼ inch thick which rests on a rubber pad 40 which covers the top face of plate 19. Just after backing plate 19 is laid on the fluid plastic the bolts are tightened slightly but not enough to force much of the viscous fluid plastic 18 out of place. After the plastic has partially set and become attached to sheet 13 and plate 19, the bolts 38 are tightened somewhat to apply enough pressure to assure that the entire lower face 14 of sheet 13 is brought into contact with master flat 12. The use of the rubber pad distributes the bolt pressure fairly uniformly over backing plate 19 and sheet 13. Upon loosening bolts 38 and removing the laminated assembly from slab 10 and turning it over, a table is provided having a hard metal top 13 whose upper face 14 is smooth and flat within a tolerance of about .001 inch. Such a table has many uses irrespective of its use as a base for a fixture or jig.

Figure 3:
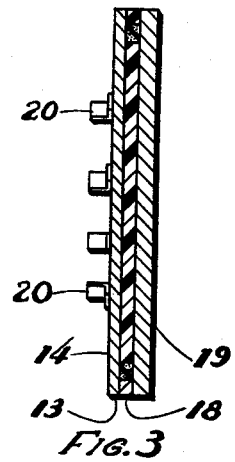
Fig. 3 is a sectional view of the fixture of Fig. 1 taken on line 3—3.
Figure 5:
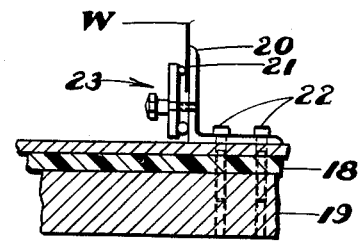
Fig. 5 is an enlarged view taken on line 5—5 showing a modified form of clamp on the fixture.
Figure 6:
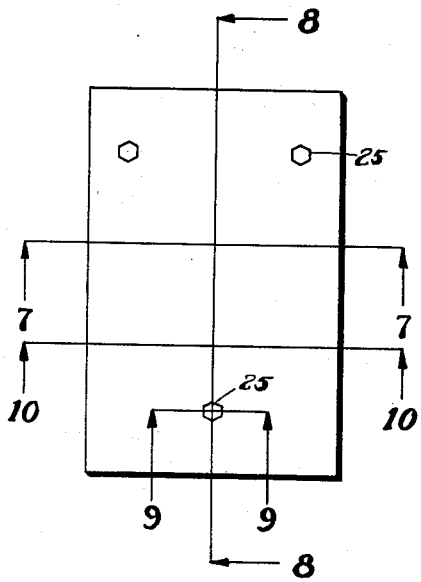
Fig. 6 is a bottom view of a table or fixture showing a modified form of the invention.
Figure 8:
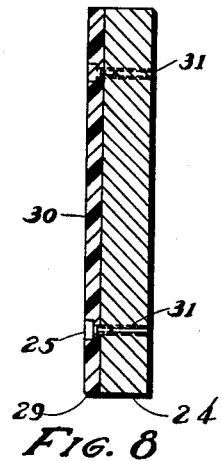
Fig. 8 is a sectional view taken on line 8—8 of Fig. 6.

When used as part of a fixture for making an airfoil or bulkhead having the contour 15, a plurality of locating blocks 20 are secured to sheet 13 with their vertical faces 21 which engage the workpiece W in alignment with contour line 15. In the modification shown in Figs. 1 and 3 the blocks are cemented to sheet 13 by any suitable quick-setting cement. In the modification shown in Fig. 5 each locating block is secured to the fixture by a pair of bolts 22 screwed into threaded holes in backing plate 19. The workpiece W is held against locating face 21 of the block by a clamp 23 of known type. This invention thus provides an inexpensive manner of making a flat table and does not require the copying of the contour curve of the workpiece on the fixture.

Figure 9:
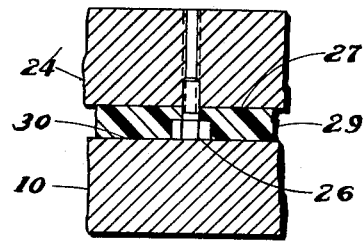
Fig. 9 is an enlarged sectional view of a portion of the table of Fig. 6 taken on line 9—9 thereof.
Figure 7:
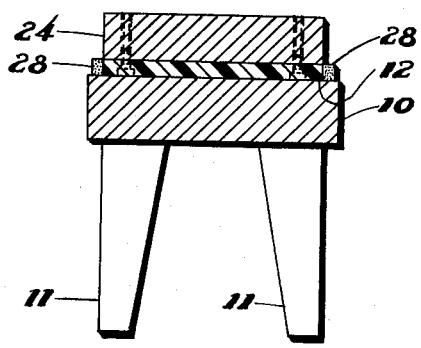
Fig. 7 is a sectional view on line 7—7 showing the fixture of Fig. 6 resting on a master surface plate.
Figure 10:
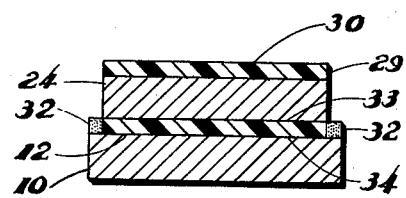
Fig. 10 is a sectional view on a reduced scale on line 10—10 showing a portion of the completed table.

In the modified form of the invention shown in Figs. 6 to 10 the table is made by first applying a very thin coating of parting agent to the level face 12 of slab 10, care being taken that the thickness of the coating is uniform. This coating may be wax, oil, one of the silicone liquid parting agents or other material which prevents the plastic compound from sticking to slab 10. A rigid backing plate 24 of metal or concrete is threaded to receive three bolts 25 whose heads are preferably flat as indicated at 26 (Fig. 9). The bolts are adjusted so that each projects the same distance (about ¼ inch) below the lower face of plate 24. If a table is to be made with a flat face having a low coefficient of friction, a thin uniform layer of finely powdered graphite or molybdenum disulfide is sprinkled or otherwise distributed over the parting agent. Backing plate 24 is then put on slab 10 resting on the heads of bolts 25 so that the bottom face 27 of the plate is uniformly spaced from face 12 of slab 10. A dam 28 of putty or similar plastic material is then built up around the edge of plate 24 and fluid plastic compound containing powdered metal dispersed therein, as above described, is poured in to fill the space between plate 24 and the parting agent. The plastic compound flows around the molybdenum particles which thus are interlocked with and firmly attached to the plastic layer 29 when the plastic sets. One or more spaced apart pour holes (not shown) may be provided around the dam 28 to receive the fluid plastic and pass it into the space between plate 24 and slab 10. Or a vertical hole (not shown) through the center of plate 24 may be provided as a pour hole to introduce the plastic.

After the plastic has set, the dam 28 may be removed and the laminated table removed from slab 10. When the table is inverted, its top face is planed within a tolerance of .001 inch and has a low coefficient of friction with steel so that height gages and other measuring instruments used in machine shops may be easily slid along it. The molybdenum powder makes the surface harder and wear-resistant but it may be omitted when these properties are not required. Also in some applications of the invention powdered metal may be omitted from the plastic mixture in which event the entire top face 30 of the table consists of the thermosetting plastic compound.

For certain purposes a table having two parallel faces is desired in which each face is smooth and level within a small tolerance. Such a table may be made by screwing three bolts into the opposite end of the holes 31 in which bolts 25 are threaded and again placing the table on slab 10 after thoroughly cleaning its top face 12 and applying a coating of parting material thereto. The bolts are adjusted until the top face 30 (see Fig. 10) of plastic layer 29 is parallel to top face 12 and the space between plate 24 and slab 10 is the desired amount. A dam 32 of putty is then built around the edges of plate 24 and a mixture of fluid plastic and powdered metal of the composition above described poured in to fill the space between slab 10 and plate 24. A plastic layer 33 is thus formed which, after curing, has a level smooth face 34 which is parallel to top face 30 of the laminate within a tolerance of .001 inch. After the plastic has cured the laminated table is removed from slab 10 and is ready for use. While the expense incident to making a slab or master surface plate 10 having a surface which is smooth and plane within a tolerance of from .0005 to .001 inch is considerable, especially if the slab has an area of over 10 square feet, this invention provides a way to make reproductions of any required size and shape up to the size of the master quickly and at small cost. Furthermore the method does not require the services of a skilled tool maker but may be carried out without the use of highly trained operators. While backing plates 19 and 24 have been shown rectangular in shape it will be understood that my method may be used with plates of any desired shapes such as triangular, circular, elliptical, etc.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. A table adapted to support a plurality of tools on its top surface comprising a straight base composed of rigid material having a rough top face with an area of at least 6 square feet and a thickness proportional to said area, the thickness of said plate being sufficient to prevent warpage thereof during the normal handling of the table and a layer of cured thermosetting plastic resin bonded to and covering said top face, the thickness of said layer being at least ¼ inch and the top surface of said layer being plane within a tolerance of the order of .001 inch, said top surface of said layer having embedded therein fine particles of a material having a low coefficient of friction less than that of said cured resin.

2. A table adapted to support a plurality of tools comprising a straight rigid base plate having a top face with an area of at least 6 square feet and a thickness proportional to said area, the thickness of said plate being sufficient to prevent warpage thereof during the normal handling of the table and a covering layer firmly bonded to said top face, said covering layer being composed of fine particles of metal dispersed in cured thermosetting plastic resin and having a thickness of at least ¼ inch, the top surface of said layer being plane within a tolerance of the order of .001 inch and exposed for the placement of the tools thereon.

3. A table as claimed in claim 2; in which at least a portion of the metal particles in the top face has a coefficient of friction substantially less than the coefficient of friction of the thermosetting plastic.

4. A table adapted to support a plurality of tools comprising a straight concrete rigid base having a thickness of at least two inches and a top surface having an area of more than 6 square feet, said thickness being proportional to said area and sufficient to retain the shape of the base, and a layer composed of cured thermosetting plastic resin and metal particles covering said top surface and firmly bonded thereto, the thickness of said layer being about ¼ inch and the top face of said layer being plane within a tolerance of the order of .001 inch and exposed for the placement of tools thereon.

References Cited in the file of this patent

UNITED STATES PATENTS

| | | |
|---|---|---|
| 1,450,185 | Myers | Apr. 3, 1923 |
| 2,039,141 | Brault | Apr. 28, 1936 |
| 2,149,732 | Groff | Mar. 7, 1939 |
| 2,193,635 | Marshall | Mar. 12, 1940 |
| 2,246,898 | Sayre | June 24, 1941 |
| 2,254,926 | Zimmerman | Sept. 2, 1941 |
| 2,318,589 | Barnette | May 11, 1943 |
| 2,444,532 | Richardson | July 6, 1948 |
| 2,454,910 | Carr | Nov. 30, 1948 |
| 2,460,242 | Renaud | Jan. 25, 1949 |
| 2,491,672 | Lowenstein | Dec. 20, 1949 |
| 2,500,598 | Axelrod | Mar. 14, 1950 |
| 2,547,087 | Milligan | Apr. 3, 1951 |
| 2,632,922 | Kish | Mar. 31, 1953 |
| 2,667,664 | Ferrell | Feb. 2, 1954 |
| 2,715,280 | Kish | Aug. 16, 1955 |
| 2,752,275 | Raskin | June 26, 1956 |

FOREIGN PATENTS

| | | |
|---|---|---|
| 551,361 | Great Britain | Feb. 18, 1943 |

OTHER REFERENCES

Concrete, pgs. 12 and 45, June 1949.
Modern Plastics, pages 109–114, September 1953.